US009738529B2

(12) United States Patent
Huber et al.

(10) Patent No.: US 9,738,529 B2
(45) Date of Patent: Aug. 22, 2017

(54) METHOD TO REDUCE $CO_2$ TO CO USING PLASMON-ENHANCED PHOTOCATALYSIS

(71) Applicant: Wisconsin Alumni Research Foundation, Madison, WI (US)

(72) Inventors: George W. Huber, Middleton, WI (US); Aniruddha A. Upadhye, Madison, WI (US); Hyung Ju Kim, Madison, WI (US); Insoo Ro, Madison, WI (US); M. Isabel Tejedor-Anderson, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 293 days.

(21) Appl. No.: 14/248,729

(22) Filed: Apr. 9, 2014

(65) Prior Publication Data

US 2015/0291434 A1 Oct. 15, 2015

(51) Int. Cl.
*B01J 19/12* (2006.01)
*C01B 31/18* (2006.01)
(Continued)

(52) U.S. Cl.
CPC .............. *C01B 31/18* (2013.01); *B01J 21/04* (2013.01); *B01J 21/063* (2013.01); *B01J 23/10* (2013.01);
(Continued)

(58) Field of Classification Search
CPC ............ A61B 17/7026; A61B 17/7011; A61B 17/7023; A61B 2017/00004;
(Continued)

(56) References Cited

U.S. PATENT DOCUMENTS

| 7,820,840 B2 | 10/2010 | Linic et al. |
| 8,986,511 B1 * | 3/2015 | Matranga ................. B01J 27/04 204/157.15 |

(Continued)

FOREIGN PATENT DOCUMENTS

WO    WO 2011/146714 A2    11/2011

OTHER PUBLICATIONS

Boccuzzi et al., Preparation, Characterization, and Activity of $CU/TiO_2$ Catalysts, *J. Catal.*, 1997, 165, 129-139.
(Continued)

*Primary Examiner* — Keith Hendricks
*Assistant Examiner* — Colleen M Raphael
(74) *Attorney, Agent, or Firm* — Joseph T. Leone, Esq.; DeWitt Ross & Stevens S.C.

(57) ABSTRACT

Described is a method of reducing $CO_2$ to CO using visible radiation and plasmonic photocatalysts. The method includes contacting $CO_2$ with a catalyst, in the presence of $H_2$, wherein the catalyst has plasmonic photocatalytic reductive activity when exposed to radiation having a wavelength between 380 nm and 780 nm. The catalyst, $CO_2$, and $H_2$ are exposed to non-coherent radiation having a wavelength between 380 nm and 780 nm such that the catalyst undergoes surface plasmon resonance. The surface plasmon resonance increases the rate of $CO_2$ reduction to CO as compared to the rate of $CO_2$ reduction to CO without surface plasmon resonance in the catalyst.

19 Claims, 12 Drawing Sheets

(51) Int. Cl.
| | |
|---|---|
| B01J 21/06 | (2006.01) |
| B01J 21/04 | (2006.01) |
| B01J 23/10 | (2006.01) |
| B01J 23/72 | (2006.01) |
| B01J 23/66 | (2006.01) |
| B01J 23/52 | (2006.01) |
| B01J 35/00 | (2006.01) |

(52) U.S. Cl.
CPC ............... *B01J 23/52* (2013.01); *B01J 23/66* (2013.01); *B01J 23/72* (2013.01); *B01J 35/004* (2013.01)

(58) Field of Classification Search
CPC ... A61B 17/7004; B01J 19/123; B01J 19/127; B01J 23/72; B01J 23/10; B01J 23/66; B01J 21/063; B01J 35/004; B01J 23/52; B01J 21/04; C01B 31/18; C01B 2210/0051; C01B 2203/0238
USPC .......................................... 204/157.47, 157.5
See application file for complete search history.

(56) References Cited

U.S. PATENT DOCUMENTS

| | | | | |
|---|---|---|---|---|
| 8,999,283 | B1* | 4/2015 | Kuhn | C01B 31/18 423/263 |
| 2008/0008639 | A1* | 1/2008 | Sakurai | B01D 53/864 204/157.3 |
| 2010/0044209 | A1* | 2/2010 | Banin | C25B 1/003 204/157.52 |
| 2010/0288356 | A1 | 11/2010 | Linic et al. | |
| 2012/0027658 | A1* | 2/2012 | Karwacki | B01D 53/864 502/304 |
| 2012/0097521 | A1* | 4/2012 | Shen | B01J 19/127 204/157.47 |
| 2012/0145532 | A1* | 6/2012 | Smolyakov | C01B 3/042 204/157.44 |
| 2013/0122396 | A1 | 5/2013 | Linic et al. | |
| 2014/0179810 | A1* | 6/2014 | Yoon | B01J 19/127 518/711 |
| 2015/0307352 | A1* | 10/2015 | Kumar | B01J 37/031 502/304 |

OTHER PUBLICATIONS

Brinker et al., The Physics and Chemistry of Sol-Gel Processing, © 1990, Academic Press, Inc. San Diego, CA, USA; ISBN 978-0-12-134970-7.

Burda et al., Chemistry and Properties of Nanocrystals of Different Shapes, *Chem. Rev.*, 2005, 105, 1025-1102.

Chen et al., Photoelectrochemical Water Splitting, Standards, Experimental Methods, and Protocols, © 2013, Springer-Verlag GmbH, Heidelberg, Germany, ISBN 978-1-4614-8298-7.

Christopher et al., 2012, Singular characteristics and unique chemical bond activation mechanism of photocatalytic reactions on plasmonic nanostructures, *Nature Materials*, 11:1044-1050.

Cronin et al., 2011, Photocatalytic Conversion of $CO_2$ to Hydrocarbon fuels via Plasmon-Enhanced Absorption and Metallic Interband Transition, *ACS Catal.* 1:929-936.

Garcia et al., Photocatalytic water gas shift using visible or simulated solar light for efficient, room-temperature hydrogen generation, *Energy Environ. Sci.* 6:2211-2215.

Hou et al., 2013, A review of Surface Plasmon Resonance-Enhanced Photoctalysis, *Adv. Funct. Mater.* 23:1612-1619.

Lu et al., Chemical synthesis of Novel Plasmonic Nanoparticles, 2009, *Annu. Rev. Phys. Chem.* 60:167-92.

Marimuthu et al., 2013, Tuning Selectivity in Propylene Epoxidation by Plasmon Mediated Photo-Switching of Cu Oxidation State, *Science* 339(6127):1590-1593.

Matranga et al., 2013, Visible light plasmonic heating of Au—ZnO for the catalytic reduction of $CO_2$, *Nanoscale* 5:6968-6974.

Nguyen et al., Deposition-precipitation versus anionic-exchange $Au/Al_2O_3$ catalysts: A comparative investigation towards the selective reduction of $NO_x$, *Catal. Commun.*, 2012, 26, 225-230.

Sastre et al., Photocatalytic water gas shift using visible or simiulated solar light for the efficient, room-temperature hydrogen generation, *Energy Environ. Sci.*, 2013, 6, 2211-2215.

Wang et al., Visible light plasmonic heating of Au—ZnO for the catalytic reduction of $CO_2$, *Nanoscale*, 2013, 5, 6968-6974.

Zanella et al., Alternative Methods for the Preparation of Gold nanoparticles Spported on $TiO_2$, *J. Catal.,, J. Phys. Chem. B*, 2002, 106, 7634-7642.

Zanella et al., Characterization and reacitivy in CO oxidation of gold nanoparticles supported on $TiO_2$ prepared by deposition-precipitation with NaOH and urea, 2004, 222, 357-367.

Aghlara et al, Noble metal nonparticle surface plasmon resonance in absorbing medium, *Optik—International Journal for Light and Electron Optics*, 2015, vol. 126, Issue. 4, pp. 417-420, Abstract Only.

Kolwas et al., size characteristics of surface plasmons and their manifestation in scattering properties of metal particles, *Journal of Quantitative Spectroscopy & Radiative Transfer*, 2009, pp. 1490-1501.

* cited by examiner

METHOD TO REDUCE CO$_2$ TO CO USING PLASMON-ENHANCED PHOTOCATALYSIS

FEDERAL FUNDING STATEMENT

This invention was made with government support awarded under DE-AR0000329 awarded by the US Department of Energy. The government has certain rights in the invention.

BACKGROUND

There are many sources of renewable energy that have been explored as possible means to limit the worldwide reliance on fossil fuels. Among the more promising renewable sources are solar energy, wind energy, hydro-generated energy (e.g., dams, tide-driven generators), geothermal energy, and biomass. With the exception of solar-derived, however, all of these sources suffer from inherent drawbacks. Hydroelectric energy, for example, requires massive infrastructure and along with it inevitable habitat destruction. Harnessing wind energy likewise requires considerable investment in infrastructure, namely large windmills arranged in very large arrays. Hydro energy, wind energy, and geothermal energy are also inherently limited to suitable geographic locations on the earth. Biomass, while promising, also brings with it potential interference with the production of food for humans because arable acreage is devoted to energy production rather than food production. The most readily available source of renewable energy, of course, is the sun. Even at the poles, the sun shines for at least part of the year. Solar energy can be harnessed passively, in the form of black bodies that are heated in the sun's rays (e.g, to heat water), or by using lenses that focus the sun's light to heat a given area. Solar energy can also be converted directly into electricity in a photovoltaic (PV) cell. The simplest of PV devices is a semiconductor photodiode. When photons of solar light contact the photodiode, electron-hole pairs ($e^-/h^+$) are generated, which are then used to carry an electric current.

Generally speaking, "photochemical" reactions are chemical reactions induced by light, e.g., photosynthesis. Photochemical reactions do not generate an electric current in the conventional sense. In contrast, photoelectrochemical (PEC) reactions operationally connect a semiconductor photovoltaic device with a chemical reaction such the energy of the photons striking the photovoltaic device are converted into electrochemical energy. The efficient use of natural sunlight in these reactions has been a long-standing research focus because PEC reactions are potentially more energy efficient than the corresponding reaction using a traditional catalyst.

For example, the idea of using a photoelectrochemical device to split water into H$_2$ and O$_2$ molecules has been investigated since the 1970's. In essence, a PEC semiconductor with appropriate electronic properties is immersed in an aqueous electrolyte and irradiated with sunlight. The photon energy from the sunlight is converted to electrochemical energy, which then breaks the H—O bonds in the water of the aqueous electrolyte. The fundamental atomic processes are reasonably well understood: Incoming solar photons of appropriate energy strike the PV cell and generate conducting electrons and corresponding holes, i.e, $e^-/h^+$ pairs. The electrons and holes move in opposite directions through the PV cell. In a simple, two-electrode device, the holes drive an oxygen evolution reaction at one electrode, and the electrons drive a hydrogen evolution reaction at the counter-electrode. See, for example, Chen, Zhebo; Dinh, Huyen; and Miller, Eric; "Photoelectrochemical Water Splitting, Standards, Experimental Methods, and Protocols,"© 2013, Springer-Verlag GmbH, Heidelberg, Germany, ISBN 978-1-4614-8298-7. See also Wenbo Hou and Stephen Cronin (2013) "A Review of Surface Plasmon Resonance-Enhanced Photocatalysis," *Adv. Funct. Mater.* 23:1612-1619.

Similarly, photocatalysis is the acceleration of a photochemical reaction in the presence of a catalyst. Several groups have investigated using heterogeneous photocatalysts to drive industrially important reactions. See, for example, Phillip Christopher, Hongliang Xin, Andiappan Marimuthu and Suljo Linic (2012) "Singular characteristics and unique chemical bond activation mechanisms of photocatalytic reactions on plasmonic nanostructures," *Nature Materials* 11:1044-1050. Here, the authors demonstrate ethylene epoxidation over an Ag/Al$_2$O$_3$ plasmonic metallic nanostructured catalyst. The authors conclude that this photocatalytic system exhibit fundamentally different behavior as compared to semiconductors. The photocatalytic reaction rates on these excited plasmonic metallic nanostructures exhibit a super-linear power law dependence on light intensity (rate∝Intensity$^n$, with n>1), at significantly lower intensity than required for super-linear behavior on extended metal surfaces. Additionally, in contrast to semiconductor photocatalysts, photocatalytic quantum efficiencies on this plasmonic metallic catalyst increased with light intensity and operating temperature. See also Andiappan Marimuthu, Jianwen Zhang, and Suljo Linic (29 Mar. 2013) "Tuning Selectivity in Propylene Epoxidation by Plasmon Mediated Photo-Switching of Cu Oxidation State," *Science* 339 (6127):1590-1593.

Photocatalysis has also been investigated as a means to convert CO$_2$ to hydrocarbon fuels (Cronin et al. (2011), "Photocatalytic Conversion of CO$_2$ to Hydrocarbon fuels via Plasmon-Enhanced Absorption and Metallic Interband Transition," *ACS Catal.* 1:929-936). Other groups have used visible light plasmonic heating of a gold/zinc oxide catalyst to drive a reverse water-gas shift reaction coupled to a methanation reaction. See Matranga et al. (2013) "Visible light plasmonic heating of Au—ZnO for the catalytic reduction of CO$_2$," *Nanoscale* 5:6968-6974. Photocatalysis has also been investigated in the context of using the forward water-gas shift reaction to generate hydrogen at room temperature. See Garcia et al. (2013) "Photocatalytic water gas shift using visible or simulated solar light for efficient, room-temperature hydrogen generation," *Energy Environ. Sci.* 6:2211-2215.

In the patent literature, see US 2013/0122396, to Linic & Christopher (published 16 May 2013). The published patent application describes a plasmon-resonating nanostructure that catalyzes the reduction of an oxidant via a photothermal mechanism. The plasmon-resonating nanostructure can be a nanoparticle that comprises copper, silver, gold, or alloys these elements. The method is described as being useful to catalyze the reduction of an oxidant, for example, in a catalytic reactor or in a fuel cell. The only oxidant described, however, is molecular oxygen, O$_2$. The publication describes CO oxidation with molecular oxygen as the oxidant (CO+½O$_2$→CO$_2$), as well as NH$_3$ oxidation with molecular oxygen as the oxidant (NH$_3$+O$_2$→N$_2$+N$_2$O+NO+NO$_2$+H$_2$O [non-stoichiometric]).

Patent publication US2010/0288356, to Linic et al. (published 18 Nov. 2010), describes a composition comprising a semiconducting photocatalyst and plasmon-resonating nanoparticles. The plasmon-resonating nanoparticles are capable of concentrating light at a wavelength that is substantially the same as the wavelength of light necessary to promote an electron from a valance band to a conduction band in the semiconductor photocatalyst. Thus, the plasmon-resonating nanoparticles direct light to the band gap of the semiconductor at an increased intensity as contrasted to when the nanoparticles are not present.

SUMMARY OF THE INVENTION

Disclosed herein is a method of reducing $CO_2$ to CO using $H_2$ as the reductant. The method comprises contacting $CO_2$ with a catalyst, in the presence of $H_2$, wherein the catalyst has plasmonic photocatalytic reductive activity when exposed to radiation having a wavelength between about 380 nm and about 780 nm (i.e., in the visible range). The catalyst, $CO_2$, and $H_2$ are then exposed to non-coherent radiation having a wavelength between about 380 nm and about 780 nm such that the catalyst undergoes surface plasmon resonance. The surface plasmon resonance causes a photocatalytic effect that increases the rate of $CO_2$ reduction to CO as compared to the rate of $CO_2$ reduction to CO without surface plasmon resonance in the catalyst. In the preferred method, the catalyst, $CO_2$, and $H_2$ are exposed to solar radiation.

The catalysts that may be used in the method generally comprise a metallic element have an average particle size no greater than 100 nm in combination with a semiconductor material. The preferred metallic elements for use in the method are calcium, copper, europium, gold, lithium, magnesium, palladium, platinum, potassium, silver, sodium, rubidium, and yttrium, and/or combinations thereof. The preferred semiconductor materials are oxides of titanium, aluminum, iron, silicon, zinc, and cerium, and/or combinations thereof. The most preferred pairings are copper, silver, platinum, or gold nanoparticles in combination with a semiconductor material comprising titania, alumina, or ceria.

As a general proposition, the surface plasmon resonance in the catalyst increases the rate of $CO_2$ reduction to CO by a factor of at least 1.8 as compared to the rate of $CO_2$ reduction to CO in the absence of surface plasmon resonance in the catalyst, and more preferably a factor of at least 3, 4, or 5 as compared to running the reaction in the absence of plasmonic photocatalysis.

More specifically disclosed herein is a method of reducing $CO_2$ to CO, wherein the method comprises contacting $CO_2$ with a catalyst, in the presence of $H_2$, wherein the catalyst has plasmonic photocatalytic reductive activity when exposed to non-coherent radiation having a wavelength between about 380 nm and about 780 nm, and exposing the catalyst, $CO_2$, and $H_2$ to solar radiation such that the catalyst undergoes surface plasmon resonance. As noted previously, the surface plasmon resonance increases the rate of $CO_2$ reduction to CO as compared to the rate of $CO_2$ reduction to CO without surface plasmon resonance in the catalyst.

It is preferred that when the reaction is run using solar radiation, the plasmonic catalyst achieves a solar light efficiency of at least about 2%, more preferably at least 3%, and more preferably still at least 4%. The same catalysts noted above may be used. The intensity of the incoming solar light may be used "as is," i.e., at an intensity of 1 sun or air mass coefficient 1.5 ("AM1.5") (conventionally taken to be 1 kW/m$^2$) or concentrated with optical elements up to an intensity of 100 suns or more. The air mass coefficient ("AM") is used to characterize the performance of solar cells under standardized conditions, and is often referred to using the syntax "AM" followed by a number. "AM1.5" is conventionally used when characterizing terrestrial power-generating solar panels. The air mass coefficient defines the direct optical path length through the Earth's atmosphere, expressed as a ratio relative to the path length vertically upwards, i.e. when the sun is at the zenith. In short, the air mass coefficient characterizes the solar spectrum after solar radiation has traveled through the atmosphere.

The methods disclosed herein are preferably conducted at a temperature of from about 100° C. to about 400° C., wherein $H_2$ is present in a greater concentration than $CO_2$, and the $H_2$ and $CO_2$ are present at a pressure of from atmospheric to about 2000 psi, absolute. (As used herein, psi=psia; that is the absolute pressure in pounds per square inch.) These are non-limiting, preferred ranges. Temperature, pressure, and concentration ranges above and below those stated are explicitly within the scope of the disclosed method.

Numerical ranges as used herein are intended to include every number and subset of numbers contained within that range, whether specifically disclosed or not. Further, these numerical ranges should be construed as providing support for a claim directed to any number or subset of numbers in that range. For example, a disclosure of from 1 to 10 should be construed as supporting a range of from 2 to 8, from 3 to 7, from 1 to 9, from 3.6 to 4.6, from 3.5 to 9.9, and so forth.

All references to singular characteristics or limitations of the present invention shall include the corresponding plural characteristic or limitation, and vice-versa, unless otherwise specified or clearly implied to the contrary by the context in which the reference is made.

All combinations of method or process steps as used herein can be performed in any order, unless otherwise specified or clearly implied to the contrary by the context in which the referenced combination is made.

The methods of the present invention can comprise, consist of, or consist essentially of the essential elements and limitations of the method described herein, as well as any additional or optional ingredients, components, or limitations described herein or otherwise useful in synthetic organic chemistry.

Figure 4:
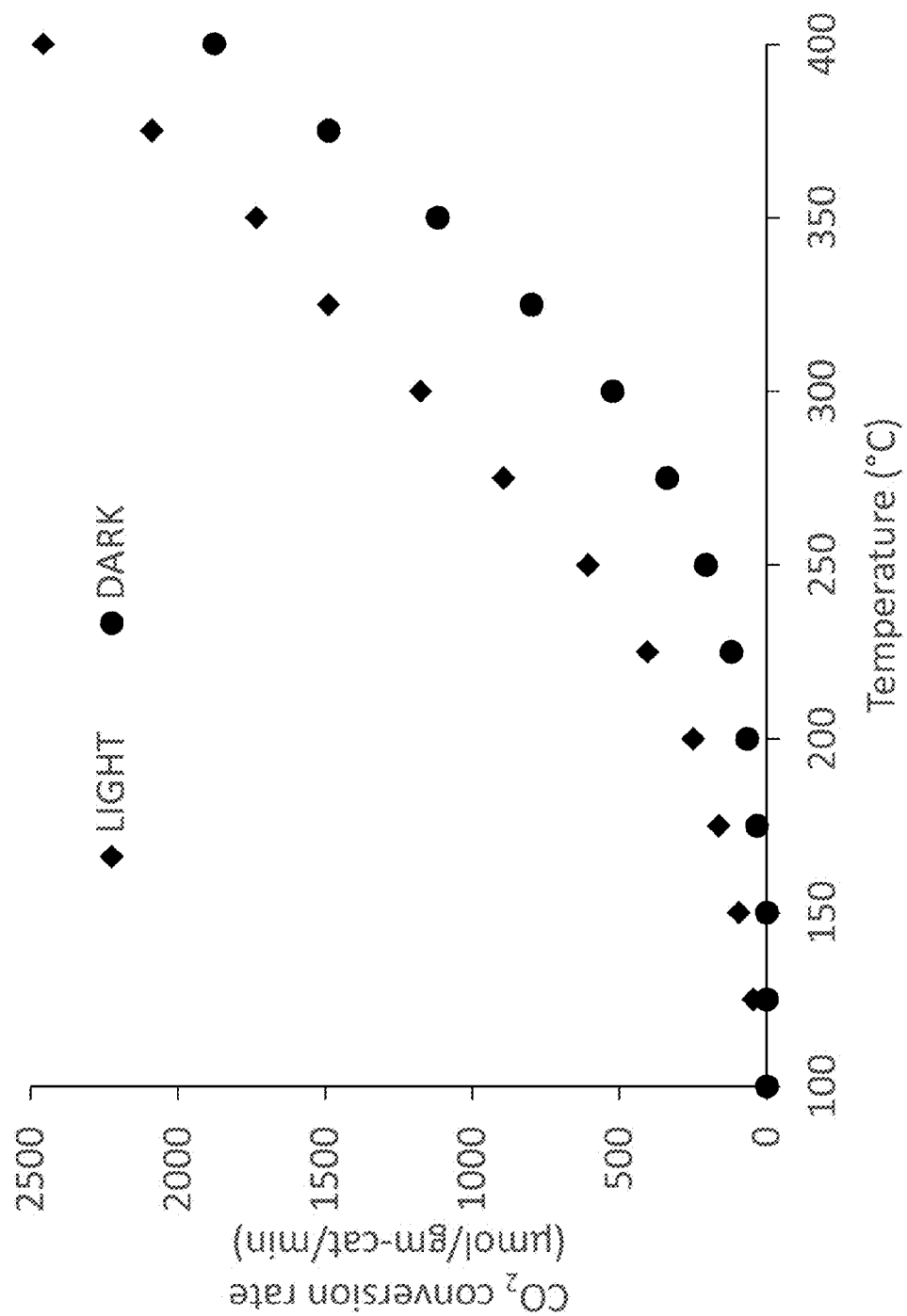

FIG. 4 is a graph depicting $CO_2$ conversion rates for the reverse water gas shift reaction as a function of temperature. Light reaction (♦); dark reaction (●). Reaction conditions: $H_2:CO_2=2:1$; total gas flow rate=15 sccm, P=110 psi, T=100° C. to 400° C.

Figure 5:
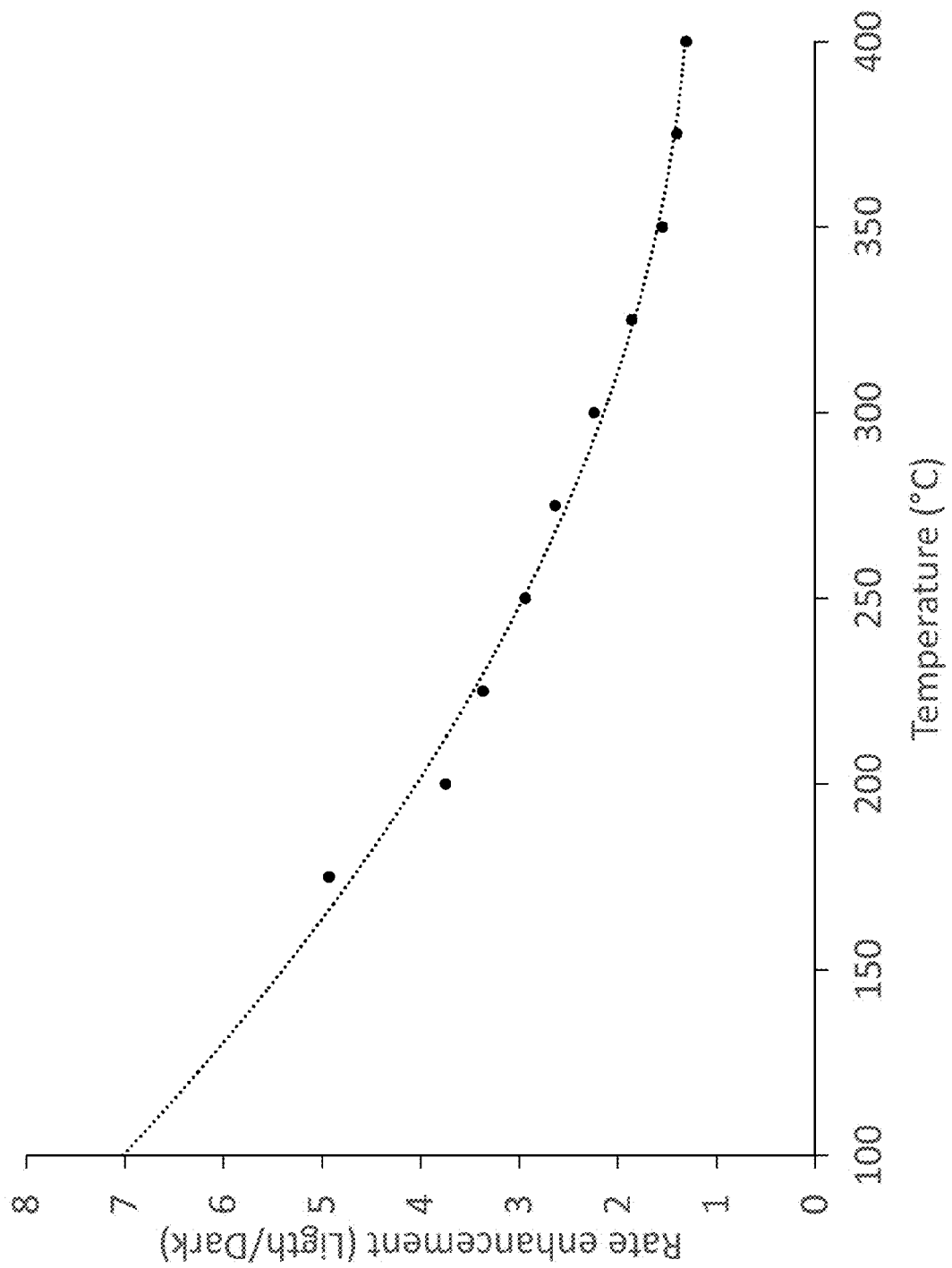

FIG. 5 is a graph depicting enhancement due to light as a function of temperature for the reverse water gas shift reactions whose conversion rates are depicted in FIG. 4. Rate enhancement (light rate/dark rate) depicted on Y-axis. As shown in the figure, the enhancement moves inversely to temperature.

Figure 6:
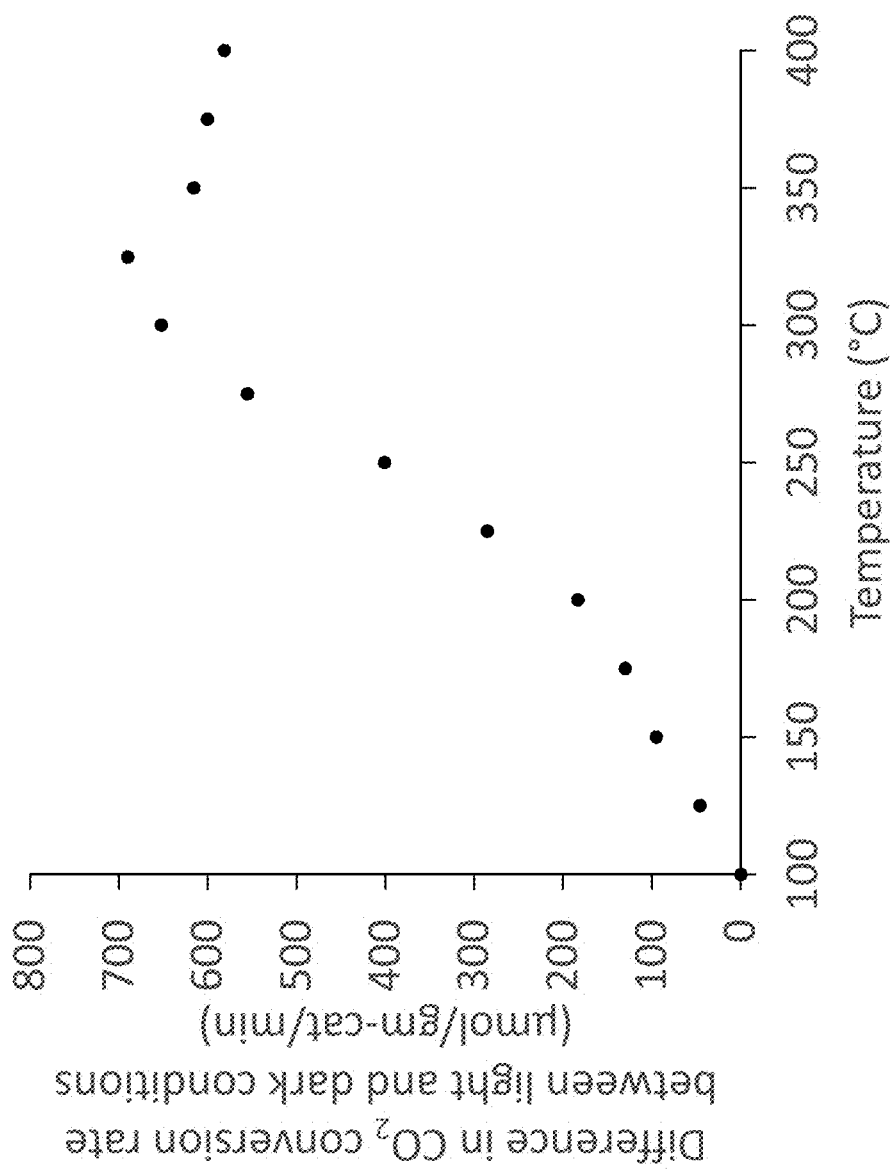

FIG. 6 is a graph depicting rate due to light versus temperature for the reverse water gas shift reactions whose conversion rates are depicted in FIG. 4.

Figure 7:
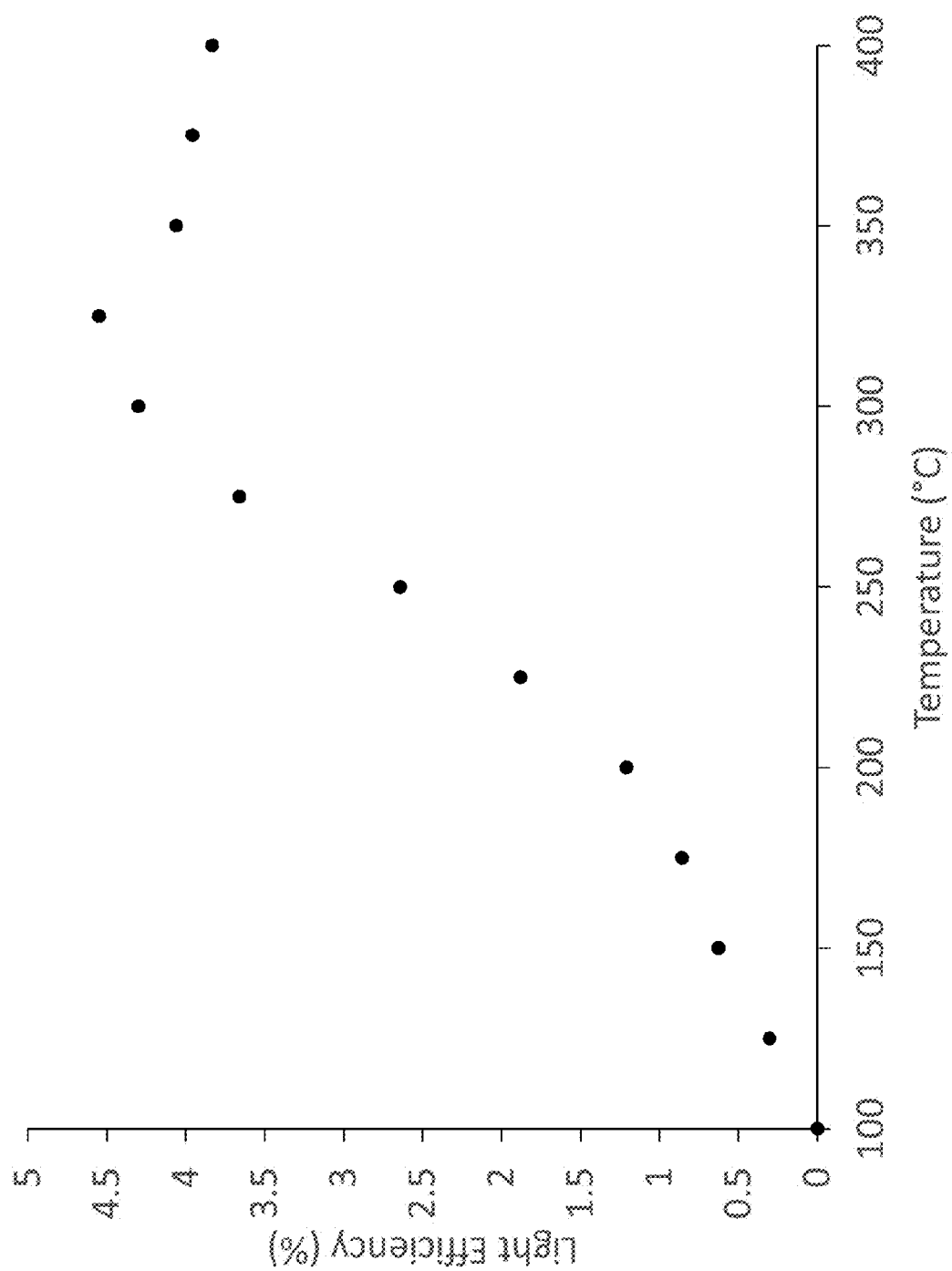

FIG. 7: is a graph depicting light efficiency versus temperature for the reverse water gas shift reactions whose conversion rates are depicted in FIG. 4. Again, Reaction conditions: $H_2:CO_2=2:1$; total gas flow rate=15 sccm, P=110 psi. Light efficiency is defined as Light efficiency (%) =

$$\frac{CO_2 \text{ conversion rate due to light} \times \Delta H_{reaction}}{\text{Intensity} \times \text{Catalyst surface area}} \times 100\%$$

Figure 8:
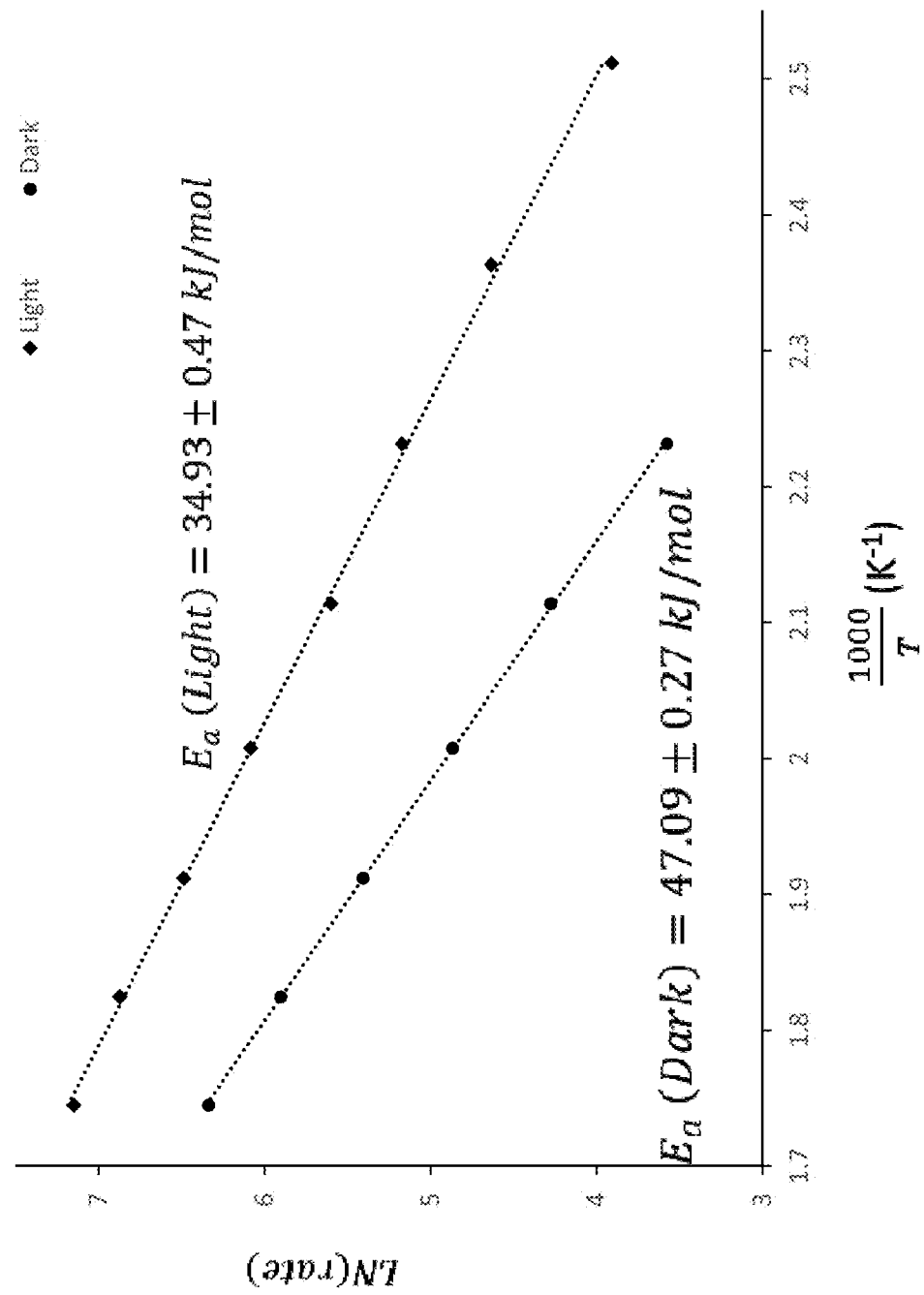

FIG. 8 is a plot depicting $\ln(CO_2$ conversion rate) versus $1/\text{Temp}(1/K) \times 10^3$ for the reverse water gas shift reactions whose conversion rates are depicted in FIG. 4. If the increased rate for the light reaction were strictly a localized heating effect, the activation energy for the light reaction versus the dark reaction should be the same. However, the dark reaction (●) has an $E_a$ of 47.09+/−0.27 kJ/mol, while the light reaction (♦) has an $E_a$ of 34.93+/−0.47 kJ/mol. The change in $E_a$ indicates that it not solely a localized heating effect that is responsible for the light-induced enhancement of the $CO_2$ reduction rates.

Figure 9:
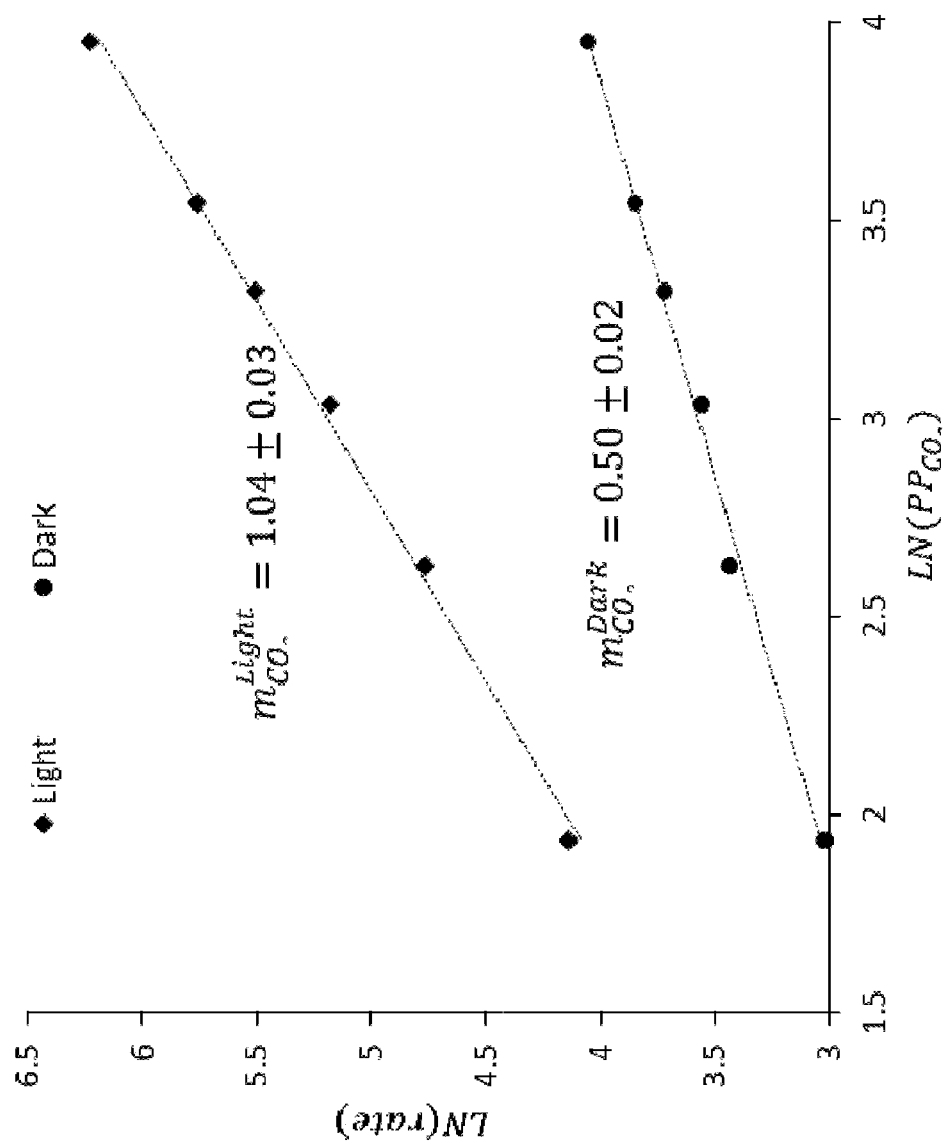

FIG. 9 is a graph depicting ln(reaction rate) for the $CO_2$ to CO reduction as a function of the ln(partial pressure of $CO_2$) for the light reaction (♦) versus the dark reaction (●). [Rate]=$Kapp_{CO2}$ $[PP_{CO2}]^m$. It was found for the light reaction that $m_{light}=1.04$; for the dark reaction, $m_{dark}=0.50$. Reaction conditions: Total gas flow rate=15 sccm, P=110 psi, T=200° C.

Figure 10:
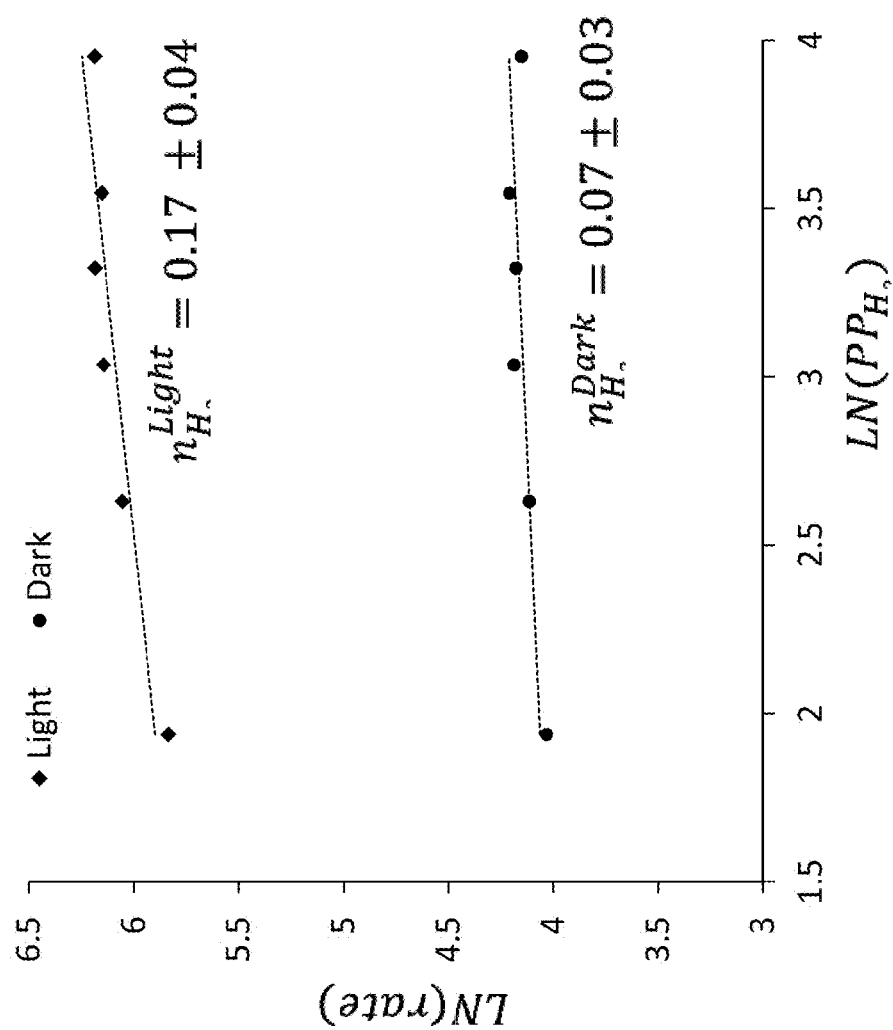

FIG. 10 is a graph similar analogous to FIG. 9, but depicting ln(reaction rate) for the $CO_2$ to CO reduction as a function of the ln(partial pressure of $H_2$) for the light reaction (♦) versus the dark reaction (●). [Rate]=$Kapp_{H2}$ $[PP_{H2}]^n$. It was found for the light reaction that $n_{light}=0.17$; for the dark reaction, $n_{dark}=0.07$. Reaction conditions were the same as noted for FIG. 9.

Figure 11:
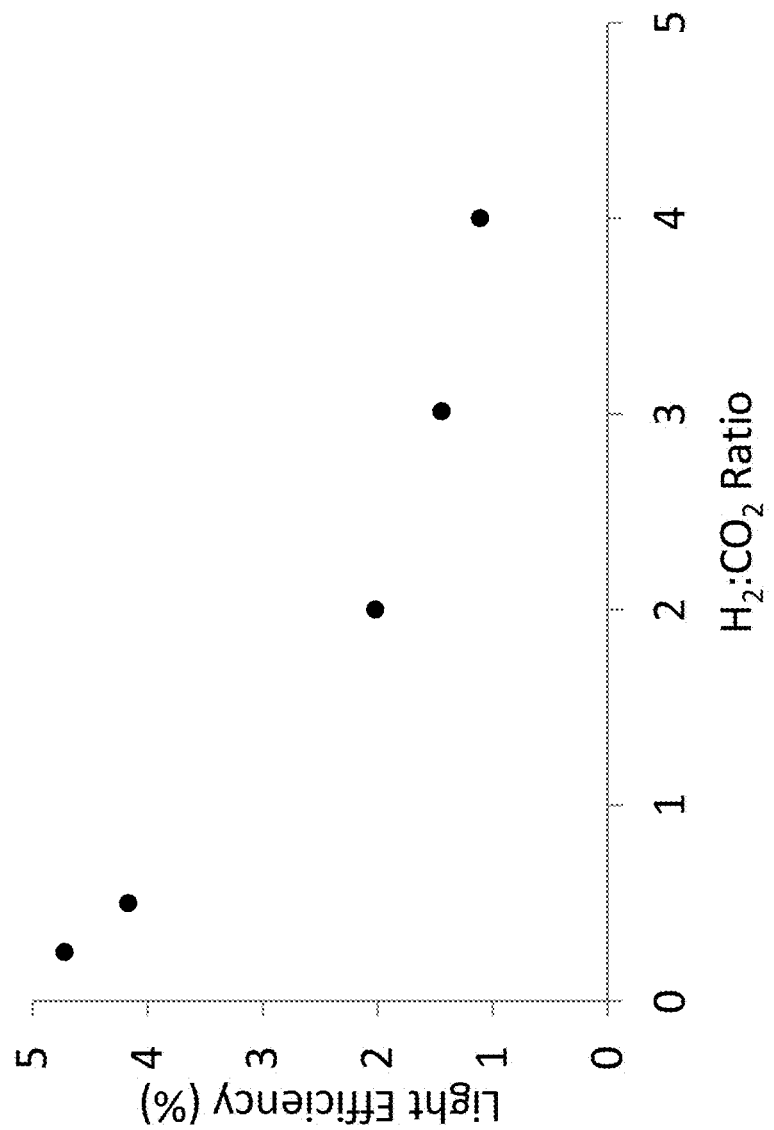

FIG. 11 is a graph depicting the dependence of light efficiency on $H_2:CO_2$ ratio in plasmon-enhanced water gas shift reaction over $Au/TiO_2$ catalyst. Experimental conditions: P=103 psi, T=200° C., Total gas flow rate=15 sccm, catalyst amount=7.9 mg.

Figure 12:
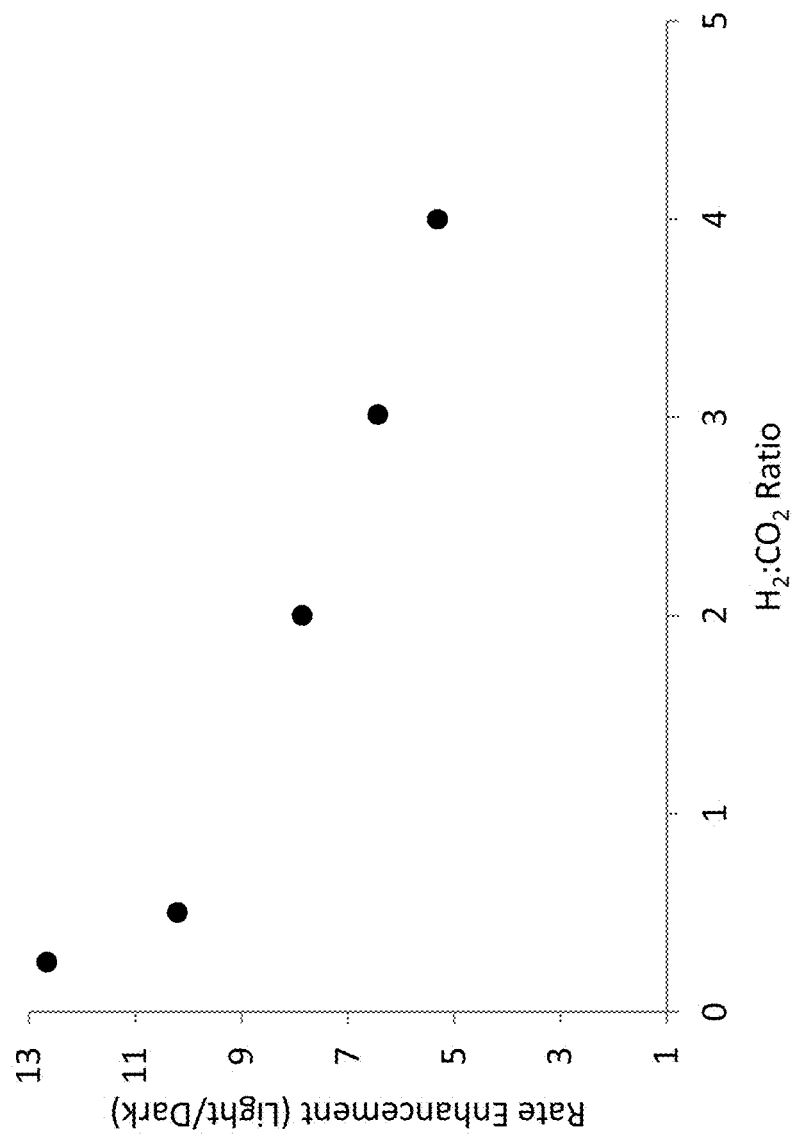

FIG. 12 is a graph depicting the dependence of rate enhancement on $H_2:CO_2$ ratio in plasmon-enhanced water gas shift reaction over $Au/TiO_2$ catalyst. Experimental conditions: P=103 psi, T=200° C., Total gas flow rate=15 sccm, catalyst amount=7.9 mg.

DETAILED DESCRIPTION

Disclosed herein is a method of reducing $CO_2$ to CO using hydrogen ($H_2$) as the reducing agent, and using plasmonic photocatalysts and visible light (preferably solar light to increase the speed of the reaction to unprecedented rates. The method includes the steps of contacting the $CO_2$ with the plasmonic photo catalyst, in the presence of $H_2$. The plasmonic photocatalytic is then exposed to non-coherent radiation having a wavelength between about 380 nm and about 780 nm (that is, in the visible range) so that the catalyst undergoes surface plasmon resonance. It has been found that when using mixed catalysts comprising a nano-particulate metal and a semiconductor, the surface plasmon resonance induced in the catalyst greatly increases the rate of $CO_2$ reduction reaction.

In particular, a catalyst comprising a noble metal nanoparticle (preferably gold) is fabricated via the sol-gel technique or deposition precipitation technique with an oxide semiconductor material, preferably a titania or alumina semiconductor. The $Au/TiO_2$ (DP), $Au/CeO_2$ (DP), $Au/Al_2O_3$ (DP) were prepared by deposition-precipitation (DP) method[1-3]. Degussa P25 $TiO_2$ (Sigma-Aldrich, St. Louis, Mo., USA >99.5%), $CeO_2$ (Sigma-Aldrich), $Al_2O_3$ (Strem Chemicals, Newburyport, Mass., USA) were used as supports, while $HAuCl_4 \cdot 3H_2O$ (Sigma-Aldrich) and $CuSO_4 \cdot 5H_2O$ (Sigman-Aldrich) were used as metal precursors for catalyst synthesis. The $Au/TiO_2$ (SG) catalyst was prepared using sol-gel chemistry[4]. The $Au/TiO_2$ (SG) solutions were then dried to obtain powdered $Au/TIO_2$ (SG) catalyst. $Au/Al_2O_3$ (IVO) catalyst was prepared by incipient wetness impregnation. $Cu/TiO_2$ (I) catalyst was prepared by impregnation (I) method[5,6]. The resulting photocatalytic material can then be used, in conjunction with light in the visible spectrum, to photocatalytically reduce $CO_2$ in the presence of hydrogen via the reverse water gas shift reaction. The reverse water gas shift reaction produces a syn-gas mixture which can then be further converted to liquid fuels using mature existing technologies.

The reverse water gas shift reaction, of course, is endothermic. Thus, the reaction needs to be driven. As described herein, it has been shown that metallic nano-particles absorb light radiation in the visible range. Thus, by coupling a suitable plasmonic catalyst comprising one or more nanoparticulate metals that exhibit surface plasmon resonance (SPR) in response to light in the visible range of wavelengths (such as the photon found in solar radiation), solar radiation (a non-coherent radiation) can be used to drive the endothermic reverse water gas shift reaction. In this sense, the plasmonic response of the catalyst has a two-fold benefit: it both derives from solar energy the energy required for the reaction, and also catalyzes the reaction. For the reverse water gas shift reaction, where $CO_2$ is being reduced to CO in the present of $H_2$, the data presented herein show that the rate of reaction increases up to 13 times under simulated solar radiation as compared to the corresponding dark reaction. Thus, process is highly useful as a means to use the visible part of sunlight to drive chemical reactions.

As used herein, the term "nanoparticle," generally refers to a particle that exhibits one or more properties not normally associated with the corresponding bulk material (e.g., quantum optical effects such as surface plasmon resonance). The term also generally refers to materials having an average particle size no larger than about 100 nm. Nanoparticles include particles of any shape or geometry (spheres, rods, other crystalline and non-crystalline shapes, etc.), including individual nanoparticles and clusters of adhered nanoparticles. The nanoparticles can have a variety of shapes, dependent or independent, on their crystalline structure. The preferred nanoparticles for use in the process comprise calcium, copper, europium, gold, lithium, magnesium, palladium, platinum, potassium, silver, sodium, rubidium, and yttrium, and/or combinations thereof, mixtures thereof, and/or alloys containing these metals. The size and/or shape of a nanoparticle can be determined by transmission electron microscopy.

Nanoparticles with well-controlled, highly-uniform sizes, and particle geometries can be fabricated using known techniques. Nanoparticles are widely available commercially from several worldwide suppliers, such as Sigma-Aldrich, St. Louis, Mo., USA. Various shapes of plasmonic nanoparticles can also be obtained by various methods such as those described in the U.S. Pat. No. 7,820,840. Some of these nanoparticles (e.g., metals with free-electron-like valence bands, such as noble metals) exhibit a strong localized surface plasmon resonance due to the nanometer scale spatial confinement, and the metal's inherent electronic structure. For example, the resonance frequency of silver and gold nanoparticles falls in the ultraviolet to visible light range, and can be tuned by changing the geometry and size of the particles. The intensity of resonant electromagnetic radiation is enhanced by several orders of magnitude near the surface of plasmonic nanoparticles. Thus, the catalysts described herein are compositions that exploit the ability of plasmonic nanoparticles to create electron-hole pairs, and simultaneously catalyze the reduction of $CO_2$ to CO.

Surface plasmon resonance (SPR) or simply plasmon resonance is an optical phenomenon arising from the collective oscillation of conduction electrons in a metal when the electrons are disturbed from their equilibrium positions. When electromagnetic energy (photons) of the proper energy impinge on such a metal, the free electrons of the metal are driven by the alternating electric field to coherently oscillate at a resonant frequency relative to the lattice of positive ions. The plasmon frequencies for most metals occur in the UV region of the electromagnetic spectrum. However several alkali metals and transition metals, including copper, silver, gold, and others have plasmon frequencies in the visible region of the spectrum. A "plasmonic nanoparticle," therefore, is a nanoparticle having conduction electrons that collectively oscillate when excited by a stream of photon of the appropriate energy (i.e., wavelength).

In the disclosed process, the plasmon resonance of the plasmonic catalyst is induced by non-coherent electromagnetic energy, preferably solar radiation. The solar radiation may be concentrated by any means or device now known or developed in the future. (A host of solar radiation concentrators are known in the art) The frequency and intensity of a plasmon resonance is generally determined by the intrinsic dielectric property of a given metal, the dielectric constant of the medium in contact with the metal, and the pattern of surface polarization. Thus, variations in the shape or size of the nanoparticulate metals in the catalyst can alter the surface polarization and cause a change to the plasmon resonance frequency. This dependence offers the ability to tune the surface plasmon resonance of metal nanoparticles through shape-controlled synthesis. A suitable shape-control synthesis is described in Lu et al. (2009) *Annu. Rev. Phys. Chem.* 60:167-92.

The radiation applied comprises incoherent radiation in the visible range, approximately 380 nm to approximately 780 nm). The wavelengths of the photons that contact the catalyst may be full spectrum or otherwise attenuated by filters, monochromators, and the like.

In various embodiments, the plasmon-resonating nanostructures include at least one of copper, silver, and gold nanoparticles. These nanoparticles may be copper/silver/gold alloy nanoparticles (e.g., copper-silver nanoparticles, copper-gold nanoparticles, silver-gold nanoparticles, copper-silver-gold nanoparticles). The nanostructures also may include, for example, silica as a core onto which the copper, silver and/or gold are deposited. In another variation, the nanostructures can be particles of substrates, for example silica, platinum, or other metal particles, onto which a plasmon-resonating layer or plasmon-resonating nanoparticle is deposited, e.g., layers or nanoparticles of Cu, Ag, and/or Au. In one preferred embodiment, the nano structures include copper. In another preferred embodiment, the nanostructures include silver. In yet another preferred embodiment, the nanostructures include gold.

There are many advantages to using plasmonic catalysts for driving solar-powered chemical reactions. Notably, plasmonic catalysts, such as $Au/TiO_2$, operate in the visible wavelength range of the solar radiation spectrum. This is an important consideration because 48% of the solar spectrum of radiation falls within the visible range, while only 6% falls within the ultraviolet range. Photocatalysts that operate only in the UV range are thus incredibly inefficient at converting solar energy into chemical energy. Thus, plasmonic catalysts that operate in the visible range of solar radiation provide higher efficiencies as compared to conventional, heterogeneous catalysts, as well as plasmonic catalysts that do not resonate in response to visible wavelengths of energy. Additionally, surface plasmon resonance itself depends on both the metal substrate selected and its particle size. The particle size dependency of SPR allows for the catalyst to be "tuned" or optimized over the visible range of wavelengths by adjusting the particle size accordingly. Additionally, there is no Shockley-Queisser limit on SPR. That is, the maximum theoretical efficiency of a p-n junction photovoltaic solar cell (as modeled by Shockley and Queisser) is a function of black-body radiation, $e^-/h^+$ pair recombination (i.e., the opposite of $e^-/h^+$ pair generation), and spectrum losses due to the wide range of wavelengths present in solar radiation. (That is, a significant portion of solar photons do not have the proper wavelength to generate $e^-/h^+$ pairs when they strike a PV panel.)

The catalysts described herein are preferably fabricated using the sol-gel technique. This technique is well known to those skilled in the art, so it will not be described in exhaustive detail. Very briefly, in a typical sol-gel process, metal alkoxide and metal chloride precursors are solubilized to form a solution (sol) and then undergo hydrolysis and polycondensation reactions to form a colloid system composed of solid particles dispersed in a solvent. These solid particles continue to coalesce until they define an inorganic network containing a liquid phase (gel). The gel is then dried to remove the liquid phase, thereby yielding a highly porous material. Because of the high porosity, catalysts fabricated by the sol-gel technique typically have very high surface areas. In effect, solid nanoparticles dispersed in a liquid (a sol) agglomerate together to form a continuous three-dimensional network extending throughout the liquid (a gel). The liquid phase is then removed. The term "sol-gel" is sometimes improperly used as a noun to refer to gels made through the sol-gel process. See, for example, Brinker and Scherer, "The Physics and Chemistry of Sol-Gel Processing," © 1990, Academic Press, Inc. San Diego, Calif., USA; ISBN 978-0-12-134970-7.

Figure 1:
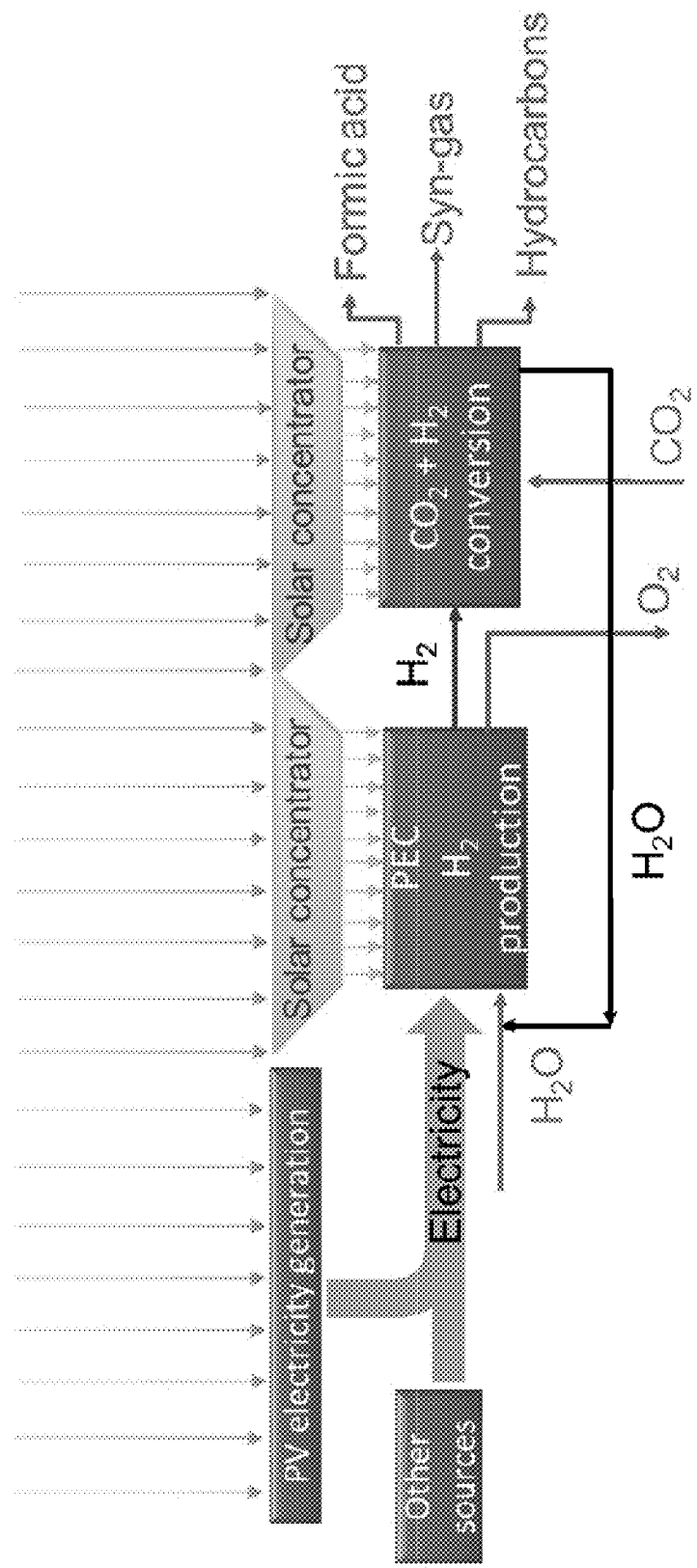
FIG. 1 is a schematic representation of harnessing solar energy to drive photoelectrochemical (PEC) splitting of water with subsequent plasmonic photocatalytic reduction of $CO_2$ to value-added products such as formic acid, syn-gas (a mixture of CO and $H_2$) and hydrocarbons.

Referring now to the figures, FIG. 1 is a schematic illustration showing how to reduce $CO_2$ to CO (and other downstream products such as formic acid, syn-gas and hydrocarbons) using $H_2$ produced from solar-powered photoelectrocatalytic (PEC) hydrolysis of water. Starting from the left-hand side of the figure, the box labeled "PV electricity generation" represents a conventional photovoltaic solar cell for producing electricity from sunlight. This electricity is then introduced into a photoelectrocatalytic reaction of water, along with additional, concentrated sunlight, as shown in the middle of FIG. 1, in the box labeled "PEC $H_2$ production." In this reactor, the water is split into $H_2$ and $O_2$ using a plamonic photoelectrochemical catalyst and solar radiation to induce the plasmonic resonance in the catalyst. Preferred catalysts for the water-splitting reaction include $Au/TiO_2$ and $Ag/TiO_2$, as well as Au, Ag, and/or Cu supported on other semiconductors. As noted previously, the preferred semiconductors are oxides of titanium, aluminum, iron, silicon, zinc, and/or cerium.

The molecular hydrogen generated by the water-splitting reaction can then be used to drive the plasmonic photocatalytic reduction of $CO_2$ (which can be obtained from a myriad of industrial processes, including any process involving the combustion of carbohydrates). This is shown in the box labeled "$CO_2+H_2$ conversion" in FIG. 1. As noted earlier, the plasmonic catalyst preferably comprises a metallic element have an average particle size no greater than 100 nm in combination with a semiconductor material. The metallic element must exhibit surface plasmon resonance, when the required average particle size range, in response to photons within the visible spectrum (about 380 to about 780 nm). The preferred nanoparticles comprise copper, mercury, ruthenium, rhodium, rhenium, palladium, silver, osmium, iridium, platinum, gold, and/or combinations thereof. The semiconductor is preferably an oxide of titanium and/or an oxide of aluminum. The radiation used to drive the plasmonic photocatalysis is preferably solar radiation.

Figure 2:
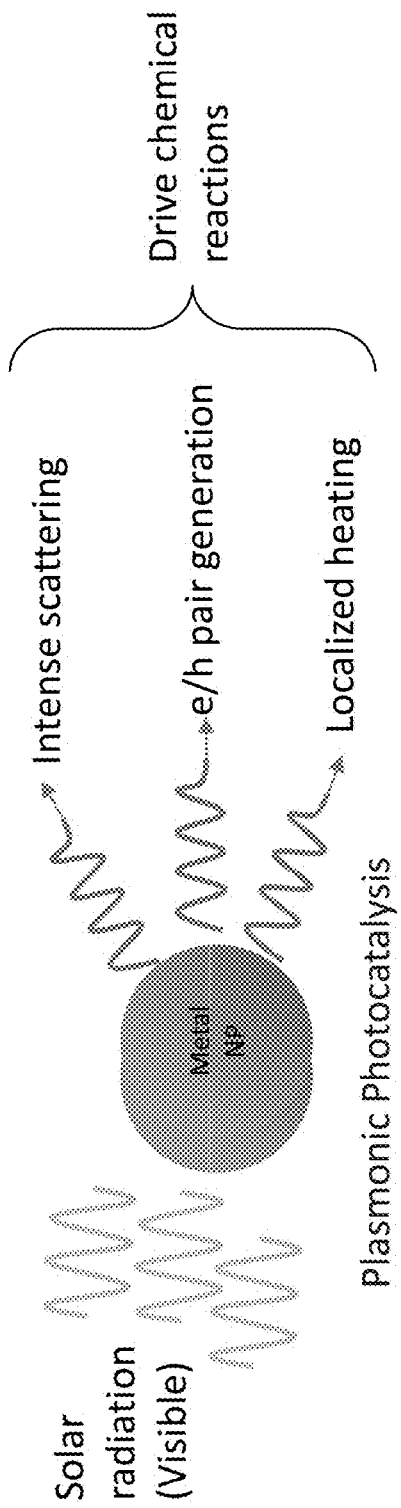
FIG. 2 is a schematic representation of plasmonic photocatalysis, illustrating that the plasmonic resonance causes a number of beneficial phenomena that drive catalysis, including intense scattering of the incoming radiation, electron/hole pair generation, and localized heating, all of which impact catalysis.

FIG. 2 is a schematic representation of the basic operation of plasmonic photocatalysis. When visible radiation induces plasmon resonance in the metallic nanoparticle ("Metal NP" in FIG. 2) a number of quantum and macro phenomena occur, including intense scattering of the incoming radiation, electron/hole pair generation, and localized heating, all of which impact catalysis and can be harnessed to drive an endothermic reaction such as the reverse water-gas shift reaction.

Figure 3:
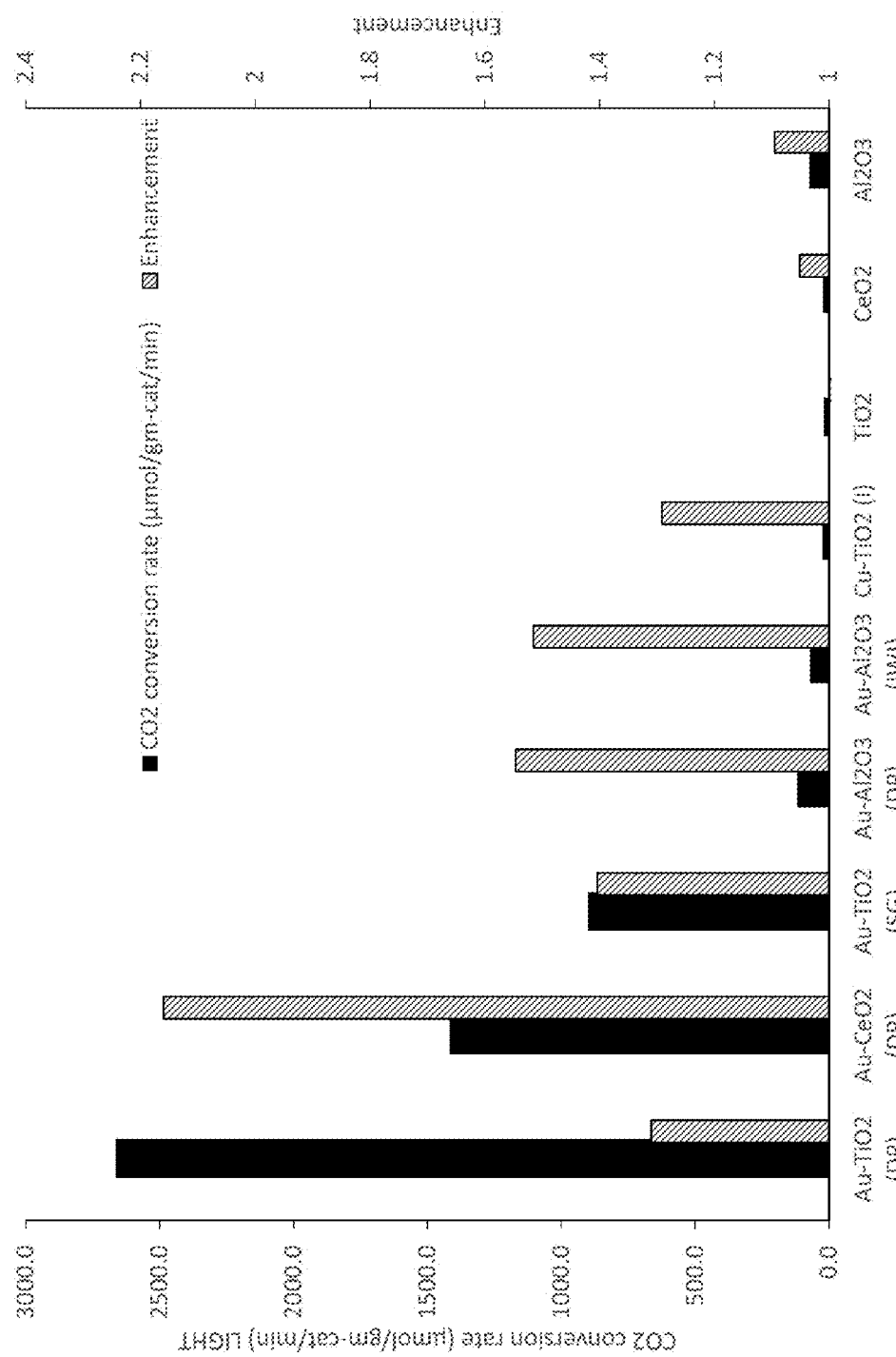
FIG. 3 is a histogram showing $CO_2$ conversion rates for the reverse water gas shift reaction ($CO_2+H_2 \rightarrow CO+H_2O$; $\Delta H_{reaction}$=41 kJ/mol) using different catalysts in "dark" mode (no added light) and "enhanced" mode (in presence of simulated solar radiation). Dark reaction shown in black bars, with rate depicted on the left-hand Y-axis; reaction with simulated solar radiation shown in open bars, with enhancement factor depicted on the right-hand Y-axis. Reaction conditions: $H_2:CO_2$=2:1; total gas flow rate=15 sccm, P=110 psi, T=400° C. (The term "sccm" denotes standard cubic centimeters per minute indicating cc/min at 0° C. at 1 atmosphere of pressure. This unit is used to calculate the amount of gas or volume of gas that passes through a given point in a unit time.)

FIG. 3 is a histogram that demonstrates the considerable reaction rate enhancement that can be achieved using the plasmonic photocatalysis method described herein as compared to traditional heterogeneous catalysis. FIG. 3 is a histogram showing $CO_2$ reduction rates for the reverse water gas shift reaction ($CO_2+H_2 \rightarrow CO+H_2O$; $\Delta H_{reaction}=41$ kJ/mol)

using different catalysts in "dark" mode (no added light) and "enhanced" mode (in presence of simulated solar radiation that causes plasmon resonance in the catalysts). In the reaction, high-pressure hydrogen and $CO_2$ ($H_2:CO_2=2:1$, 110 psi) were flowed into a sealed photocatalytic reaction vessel at 15 sccm and 400° C. Light reactions (using simulated solar radiation) and dark reactions were conducted for six different catalyst compositions, as noted in the figure. The results for the dark reactions are shown in black bars, with the reaction rate (μmol/gm-cat/min) depicted on the left-hand Y-axis. The enhancement of the reaction rate when exposed to simulated solar radiation is shown in open bars, with the enhancement factor depicted on the right-hand Y-axis. As can be seen from FIG. 3, $CeO_2$, $Al_2O_3$, $TiO_2$ on their own, in the dark, is a rather poor catalyst (relative to the others) for the reverse water-gas shift reaction. Even so, when run plasmonically, the reaction rate for $TiO_2$ improved by almost 100%. Under these conditions, a catalyst comprised of nanoparticulate gold and $TiO_2$ was a reasonably good catalyst when run in dark mode, and the dark rate was improved by almost 200% when the reaction was run plasmonically. For all of the catalyst combinations depicted in FIG. 3, the plasmonic enhancement of the reaction rate was significant. See also Table 1.

TABLE 1

$CO_2$ Conversion Rates under Various Conditions

| Sr. No. | Catalyst | Catalyst Amount (mg) | $CO_2$ conversion rate (μmol/gm-cat/min) | | | Enhancement (LIGHT-DARK) |
|---|---|---|---|---|---|---|
| | | | DARK | LIGHT | (LIGHT-DARK) | |
| 1 | Au—$TiO_2$ (DP) | 7.4 | 2033.4 | 2663.4 | 630.1 | 1.3 |
| 2 | Au—$CeO_2$ (DP) | 12.8 | 655.9 | 1416.6 | 760.8 | 2.2 |
| 3 | Au—$TiO_2$ (SG) | 12.4 | 641.2 | 900.4 | 259.2 | 1.4 |
| 4 | Au-$Al_2O_3$ (DP) | 16.6 | 76.5 | 118.3 | 41.8 | 1.5 |
| 5 | Au-$Al2O_3$ (IWI) | 13.1 | 47.3 | 71.6 | 24.4 | 1.5 |
| 6 | Cu—$TiO_2$ (I) | 8.6 | 19.5 | 25.1 | 5.7 | 1.3 |
| 7 | $TiO_2$ | 12.2 | 21.2 | 18.9 | −2.3 | 0.9 |
| 8 | $CeO_2$ | 23.9 | 21.0 | 22.0 | 1.1 | 1.1 |
| 9 | $Al2O_3$ | 30.00 | 67.4 | 73.8 | 6.4 | 1.2 |

In light of these results, using the reverse water gas shift reaction over an $Au/TiO_2$ catalyst run plasmonically and in the dark as a means to reduce $CO_2$ with $H_2$ was investigated in greater detail. FIG. 4 is a graph that depicts the rate of the reduction reaction as a factor of temperature for both the plasmonic reactions ("light", ♦) and dark reactions, ●. Of particular note in FIG. 4 is the enhancement of the plasmonic reaction rates across all temperatures tested. As the temperature rises, the reaction rate predictably rises. The reaction is endothermic, so its rate would be expected to rise with rising temperature. However, the enhancement due to running the reaction plasmonically is not expected, especially at the higher end of the temperature range. That is, at the higher end of the temperature range, the expectation is that the thermal effect on catalysis would dominate and the enhancement due to running the reaction plasmonically would decrease or disappear entirely. However, even at the highest temperature tested, 400° C., FIG. 4 shows that there is a very significant enhancement in the reaction rate between the light reaction and the dark reaction.

FIG. 5 presents the enhancement data between the light reaction versus the dark reaction in isolation—i.e., it is a graph depicting the enhancement in rate due to running the reaction plasmonically as a function of temperature for the reverse water gas shift reactions described above for FIG. 4. Here, the data show that in a direct comparison, the enhancement factor (i.e., the rate of light reaction/rate of dark reaction) is more pronounced at 100° C. and decreases in a smooth curve to approximately a factor of 2 at 400° C. Extrapolated, these data indicate a light enhancement of a factor of 7; i.e., 700%. These same date are presented in FIG. 6 not as a rate enhancement, but rather as the actual difference between $CO_2$ reduction rate (μmol/gm-cat/min) under light and dark vs. temperature that can be attributed solely to the plasmonic influence of the catalyst (and not temperature). FIG. 6 indicates that the maximum plasmonic-induced enhancement in the reaction rate as a function of temperature-induced increases in reaction rate peaks somewhere between about 300° C. and about 350° C. in the $Au/TiO_2$ system. FIG. 7 corroborates these findings by showing that the light efficiency versus temperature for this same reaction also reaches a peak between about 300° C. and about 350° C. In FIG. 7, light efficiency is defined as $$\text{Light efficiency (\%)} = \frac{CO_2 \text{ conversion rate due to light} \times \Delta H_{reaction}}{\text{Intensity} \times \text{Catalyst surface area}} \times 100\%$$

The salient point of FIGS. 4 through 7 taken together is that the visible light energy that induces plasmonic activity in the catalyst is the cause of a very marked increase in the reaction rate of the reverse water-gas shift reaction. The enhancement is achieved using simulated, non-coherent solar radiation.

Now, it could be possible that the enhanced catalytic effect is not a photocatalytic effect, per se, but simply a thermal effect due to localized heating caused by the surface plasmon resonance. To investigate this possibility, an Arrhenius plot (ln(rate) v 1/T) was constructed for the light reactions described above for FIGS. 4-7 and the corresponding dark reactions. The results are shown in FIG. 8. Thus, FIG. 8 is a plot depicting ln($CO_2$ reduction rate) versus 1/Temp(1/K)×$10^3$ for the reverse water gas shift reactions. The plots for the light reaction versus the dark reaction clearly show different activation energies. If the increased rate for the light reaction were strictly a localized heating effect, the activation energy for the light reaction versus the dark reaction should be the same. However, the dark reaction (♦) has an $E_a$ of 47.09+/−0.27 kJ/mol, while the light reaction (●) has an $E_a$ of 34.93+/−0.47 kJ/mol. The change in $E_a$ indicates that it not solely a localized heating effect that is responsible for the light-induced enhancement of the $CO_2$ reduction rates.

FIGS. 9 and 10 are corresponding plots that map the ln(rate of $CO_2$ reduction) versus the ln(partial pressure of $CO_2$) (FIG. 9) and ln(rate) versus the ln(partial pressure of $H_2$) (FIG. 10) for the light (♦) and dark (●) reactions. In both figures, the reaction conditions were identical: Total gas flow rate=15 sccm, P=110 psi, T=200° C., $H_2:CO_2$=2:1. In FIG. 9, the rate equation sets up as $[\text{Rate}]=\text{Kapp}_{CO2}[PP_{CO2}]^m$. Thus, the exponent "m" is the reaction order and its value is dependent upon the mechanism that causes the $CO_2$ reduction. In FIG. 9, which is the data based on the partial pressure of $CO_2$, it was found for the light reaction that $m_{light}$=1.04; for the dark reaction, $m_{dark}$=0.50. These data clearly indicate that there is a distinctly different reaction mechanism for the "light," plasmonically catalyzed reaction as compared to the dark reaction.

The same holds true when ln(rate) versus the ln(partial pressure of $H_2$) is plotted for the light reaction versus the dark reaction. See FIG. 10. Here, the rate equation sets up as $[\text{Rate}]=\text{Kapp}_{H2}[PP_{H2}]^n$. It was found for the light reaction that $n_{light}$=0.17; for the dark reaction, $n_{dark}$=0.07.

FIGS. 11 and 12 is a graph depicting the dependence of light efficiency and rate enhancement on $H_2:CO_2$ ratio in plasmon-enhanced water gas shift reaction over $Au/TiO_2$ catalyst. Experimental conditions: P=103 psi, T=200° C., Total gas flow rate=15 sccm, catalyst amount=7.9 mg. As can be seen in FIG. 11, lower the ratio of $H_2:CO_2$ in the plasmonically catalyzed reaction results in the higher light efficiency of the reaction. That is, at high light efficiencies, the reaction produced increased amounts of $H_2$ as compared to $CO_2$. FIG. 12 shows that at low $H_2:CO_2$ ratio, plasmonic rate enhancement up to 1300% can be achieved.

Suitable catalysts for use in the present method may be fabricated by the following methods. Note that these methods are exemplary and are included solely to provide a more complete disclosure of the method claimed herein. The exemplary catalysts are not limiting.

Preparation of $Au/TiO_2$ (DP) Catalyst:

The $Au/TiO_2$ DP was prepared by deposition-precipitation with NaOH (1M)[1,2]. Titania Degussa P25 was used as support (Sigma-Aldrich, >99.5% trace metal basis) and solid $HAuCl_4·3H_2O$ (Sigma-Aldrich, >99.9% trace metal basis) as the precursor. Before the preparation, $TiO_2$ was dried in the air at 110° C. overnight. 100 ml of aqueous $HAuCl_4$ solution (4.2*$10^{-3}$ M) was heated to 80° C. and the pH was adjusted to 8 by drop-wise addition of NaOH (1M). Then, 1 g of $TiO_2$ was dispersed in the solution, and the pH was readjusted to 8 with NaOH. The suspension was thermostated at 80° C. was stirred for 2 h and centrifuged. The solids were then washed, dried, and calcined at 300° C. under the flow of air (30 ml/min) with a heating rate of 2° C./min and maintained for 4 h.

Preparation of $Au/CeO_2$ DP Catalyst:

The $Au/CeO_2$ (DP)[5] was prepared by deposition-precipitation with NaOH (1M) which is same with $Au/TiO_2$ (DP)[1,2]. Cerium (IV) oxide was used as support (Sigma-Aldrich) and solid $HAuCl_4·3H_2O$ (Sigma-Aldrich, >99.9% trace metal basis) as the precursor. Before the preparation, $CeO_2$ was dried in the air at 110° C. overnight. 100 ml of aqueous $HAuCl_4$ solution (4.2*$10^{-3}$ M) was heated to 80° C. and the pH was adjusted to 8 by drop-wise addition of NaOH (1M). Then, 1 g of $CeO_2$ was dispersed in the solution, and the pH was readjusted to 8 with NaOH. The suspension was thermostated at 80° C. was stirred for 2 h and centrifuged. The solids were then washed, dried, and calcined at 300° C. under the flow of air (30 ml/min) with a heating rate of 2° C./min and maintained for 4 h.

Preparation of $Au/Al_2O_3$ (DP) Catalyst:

The $Au/Al_2O_3$ (DP)[3] was prepared by deposition-precipitation with NaOH (1M) which is same with $Au/TiO_2$ (DP)[1,2]. Alumina was used as support (Strem Chemicals) and solid $HAuCl_4·3H_2O$ (Sigma-Aldrich, >99.9% trace metal basis) as the precursor. Before the preparation, $Al_2O_3$ was dried in the air at 110° C. overnight. 100 ml of aqueous $HAuCl_4$ solution (4.2*$10^{-3}$ M) was heated to 80° C. and the pH was adjusted to 8 by drop-wise addition of NaOH (1M). Then, 1 g of $Al_2O_3$ was dispersed in the solution, and the pH was readjusted to 8 with NaOH. The suspension was thermostated at 80° C. was stirred for 2 h and centrifuged. The solid was then washed, dried, and calcined at 300° C. under the flow of air (30 ml/min) with a heating rate of 2° C./min and maintained for 4 h.

Preparation of Cu/TiO$_2$ (I) Catalyst:

The Cu/TiO$_2$ (I) was prepared by impregnating 1 g of titania Degussa P25 (Sigma-Aldrich, >99.5% trace metal basis) with a solution of 53 mg of CuSO$_4$.5H$_2$O (Sigma-Aldrich, puriss, meets analytical specification of Ph. Eur., BP, USP, 99-100.5%) in 10 ml of DI water[5,6]. The slurry was stirred for 4 h at room temperature, then all liquid was evaporated and the solid was dried at 110° C. overnight. The catalyst was calcined at 300° C. under the flow of air (30 ml/min) with a heating rate of 2° C./min and maintained for 4 h.

REFERENCE CITED

1. R. Zanella, S. Giorgio, C. H. Shin, C. R. Henry and C. Louis, *J. Catal.*, 2004, 222, 357-367.
2. R. Zanella, S. Giorgio, C. R. Henry and C. Louis, *J. Phys. Chem. B*, 2002, 106, 7634-7642.
3. D. L. Nguyen, S. Umbarkar, M. K. Dongare, C. Lancelot, J. S. Girardon, C. Dujardin and P. Granger, *Catal. Commun.*, 2012, 26, 225-230.
4. C. Burda, X. Chen, R. Narayanan and M. A. El-Sayed, *Chem. Rev.*, 2005, 105, 1025-1102.
5. F. Sastre, M. Oteri, A. Corma and H. Garcia, *Energy Environ. Sci.*, 2013, 6, 2211-2215.
6. F. Boccuzzi, A. Chiorino, G. Martra, M. Gargano, N. Ravasio and B. Carrozzini, *J. Catal.*, 1997, 165, 129-139.

What is claimed is:

1. A method of reducing CO$_2$ to CO, the method comprising:
    (a) contacting CO$_2$ with a catalyst, in the presence of H$_2$, wherein the H$_2$ is present in a greater concentration than the CO$_2$, wherein the catalyst has plasmonic photocatalytic reductive activity when exposed to radiation having a wavelength between about 380 nm and about 780 nm, and wherein the catalyst comprises a metallic element selected from the group consisting of calcium, copper, europium, gold, lithium, magnesium, palladium, platinum, potassium, silver, sodium, rubidium, and yttrium, and combinations thereof, has an average particle size no greater than 100 nm, and is deposited on an oxide semiconductor material; and
    (b) exposing the catalyst, CO$_2$, and H$_2$ to non-coherent radiation having a wavelength between about 380 nm and about 780 nm such that the catalyst undergoes surface plasmon resonance, wherein the surface plasmon resonance increases the rate of CO$_2$ reduction to CO as compared to the rate of CO$_2$ reduction to CO without surface plasmon resonance in the catalyst.

2. The method of claim 1, comprising, in step (b), exposing the catalyst, CO$_2$, and H$_2$ to solar radiation.

3. The method of claim 1, wherein the oxide semiconductor material is selected from the group consisting of oxides of titanium, aluminum, iron, silicon, zinc, and cerium, and combinations thereof.

4. The method of claim 1, wherein the metallic element comprises copper, silver, platinum, or gold, and the semiconductor material comprises titania or ceria.

5. The method according to any one of claim 1, 2, 3, or 4, wherein the surface plasmon resonance in the catalyst increases the rate of CO$_2$ reduction to CO by a factor of at least 1.8 as compared to the rate of CO$_2$ reduction to CO in the absence of surface plasmon resonance in the catalyst.

6. The method according to any one of claim 1, 2, 3, or 4, wherein the surface plasmon resonance in the catalyst increases the rate of CO$_2$ reduction to CO by a factor of at least 3 as compared to the rate of CO$_2$ reduction to CO in the absence of surface plasmon resonance in the catalyst.

7. The method according to any one of claim 1, 2, 3, or 4, wherein the surface plasmon resonance in the catalyst increases the rate of CO$_2$ reduction to CO by a factor of at least 4 as compared to the rate of CO$_2$ reduction to CO in the absence of surface plasmon resonance in the catalyst.

8. The method according to any one of claim 1, 2, 3, or 4, wherein the surface plasmon resonance in the catalyst increases the rate of CO$_2$ reduction to CO by a factor of at least 5 as compared to the rate of CO$_2$ reduction to CO in the absence of surface plasmon resonance in the catalyst.

9. A method of reducing CO$_2$ to CO, the method comprising:
    (a) contacting CO$_2$ with a catalyst, in the presence of H$_2$, wherein the H$_2$ is present in a greater concentration than the CO$_2$, wherein the catalyst has plasmonic photocatalytic reductive activity when exposed to non-coherent radiation having a wavelength between about 380 nm and about 780 nm, and wherein the catalyst comprises a metallic element selected from the group consisting of calcium, copper, europium, gold, lithium, magnesium, palladium, platinum, potassium, silver, sodium, rubidium, and yttrium, and combinations thereof, has an average particle size no greater than 100 nm, and is deposited on an oxide semiconductor material; and
    (b) exposing the catalyst, CO$_2$, and H$_2$ to solar radiation such that the catalyst undergoes surface plasmon resonance, wherein the surface plasmon resonance increases the rate of CO$_2$ reduction to CO as compared to the rate of CO$_2$ reduction to CO without surface plasmon resonance in the catalyst.

10. The method of claim 9, wherein upon exposing the catalyst, CO$_2$, and H$_2$ to solar radiation, the catalyst achieves a light efficiency of at least about 2%.

11. The method of claim 9, wherein upon exposing the catalyst, CO$_2$, and H$_2$ to solar radiation, the catalyst achieves a solar light efficiency of at least about 3%.

12. The method of claim 9, wherein upon exposing the catalyst, CO$_2$, and H$_2$ to solar radiation, the catalyst achieves a solar light efficiency of at least about 4%.

13. The method of claim 9, wherein the oxide semiconductor material is selected from the group consisting of oxides of titanium, aluminum, iron, silicon, zinc, and cerium, and combinations thereof.

14. The method of claim 9, wherein the metallic element comprises copper, silver, platinum, or gold, and the semiconductor material comprises titania or ceria.

15. The method according to any one of claim 9, 10, 11, 12, 13, or 14, wherein the surface plasmon resonance in the catalyst increases the rate of CO$_2$ reduction to CO by a factor of at least 1.8 as compared to the rate of CO$_2$ reduction to CO in the absence of surface plasmon resonance in the catalyst.

16. The method according to any one of claim 9, 10, 11, 12, 13, or 14, wherein the surface plasmon resonance in the catalyst increases the rate of CO$_2$ reduction to CO by a factor of at least 3 as compared to the rate of CO$_2$ reduction to CO in the absence of surface plasmon resonance in the catalyst.

17. The method according to any one of claim 9, 10, 11, 12, 13, or 14, wherein the surface plasmon resonance in the catalyst increases the rate of CO$_2$ reduction to CO by a factor of at least 4 as compared to the rate of $CO_2$ reduction to CO in the absence of surface plasmon resonance in the catalyst.

18. The method according to any one of claim 9, 10, 11, 12, 13, or 14, wherein the surface plasmon resonance in the catalyst increases the rate of $CO_2$ reduction to CO by a factor of at least 5 as compared to the rate of $CO_2$ reduction to CO in the absence of surface plasmon resonance in the catalyst.

19. The method of any one of claim 9, 10, 11, 12, 13, or 14, wherein the method is conducted at a temperature of from about 100° C. to about 400° C., wherein $H_2$ is present in a greater concentration than $CO_2$, and the $H_2$ and $CO_2$ are present at a pressure of from atmospheric to about 2000 psi.

\* \* \* \* \*